US011625867B2

(12) United States Patent
Takemoto et al.

(10) Patent No.: US 11,625,867 B2
(45) Date of Patent: Apr. 11, 2023

(54) SEWING APPARATUS

(71) Applicant: JUKI CORPORATION, Tama (JP)

(72) Inventors: Yuuko Takemoto, Tokyo (JP); Shigemi Yamamoto, Tokyo (JP); Shuichi Saito, Tokyo (JP)

(73) Assignee: JUKI CORPORATION, Tama (JP)

( * ) Notice: Subject to any disclaimer, the term of this patent is extended or adjusted under 35 U.S.C. 154(b) by 0 days.

(21) Appl. No.: 17/396,843

(22) Filed: Aug. 9, 2021

(65) Prior Publication Data

US 2022/0051452 A1 Feb. 17, 2022

(30) Foreign Application Priority Data

Aug. 12, 2020 (JP) .............................. JP2020-136438

(51) Int. Cl.
*G06T 11/00* (2006.01)
*G09G 5/02* (2006.01)
(Continued)

(52) U.S. Cl.
CPC ............ *G06T 11/001* (2013.01); *D05B 69/30* (2013.01); *D05D 2205/085* (2013.01);
(Continued)

(58) Field of Classification Search
CPC ............... G06T 11/001; G06T 2200/24; G06T 2210/16; G06T 2207/10024; D05D 2205/085; G09G 5/02; G09G 5/024; G09G 5/30; G09G 5/37; G09G 2320/00; G09G 2320/02; G09G 2320/0233; G09G 2320/0238; G09G 2320/06; G09G 2320/0626; G09G 2320/0666;
(Continued)

(56) References Cited

U.S. PATENT DOCUMENTS 5,782,189 A 7/1998 Hirata et al.
2019/0235739 A1* 8/2019 Bowen ................... A41H 3/007
(Continued)

FOREIGN PATENT DOCUMENTS

JP H09-290083 A 11/1997
JP 2000-126484 A 5/2000
(Continued)

OTHER PUBLICATIONS

Extended European Search Report dated Dec. 6, 2021 in European Patent Application No. 21190480.0.

*Primary Examiner* — Wesner Sajous
(74) *Attorney, Agent, or Firm* — Faegre Drinker Biddle & Reath LLP

(57) ABSTRACT

A sewing apparatus, includes a display input unit including a display unit configured to display an image of an input screen, and an input detection unit configured to detect an input operation on the input screen; and a control apparatus that performs display control of the display unit in response to the input operation. The control apparatus performs display control in which a background of the input screen is set to a dark color as a whole, a sewing pattern image displayed on the input screen is set to brightness higher than that of the background, and an operation unit that receives the input operation on the input screen is set to a color lighter than that of the background.

7 Claims, 7 Drawing Sheets

(51) Int. Cl.
*G09G 5/30* (2006.01)
*G06F 3/048* (2013.01)
*H04N 1/60* (2006.01)
*H04N 5/57* (2006.01)
*D05B 69/30* (2006.01)
*G06F 3/04883* (2022.01)

(52) U.S. Cl.
CPC ...... *G06F 3/04883* (2013.01); *G06T 2200/24* (2013.01); *G06T 2210/16* (2013.01)

(58) Field of Classification Search
CPC ............. G09G 2320/0686; H04N 1/60; H04N 1/6027; H04N 1/6038; H04N 1/6041; H04N 5/232933; H04N 5/57; H04N 9/64; H04N 9/77; G06F 3/048; G06F 3/0484; G06F 3/0482; G06F 3/04842; G06F 3/04845; G06F 3/04847; G06F 3/0488
USPC ........................................................ 345/594
See application file for complete search history.

(56) References Cited

U.S. PATENT DOCUMENTS

| | | | |
|---|---|---|---|
| 2021/0165918 A1* | 6/2021 | Bowen | G06T 11/60 |
| 2022/0108042 A1* | 4/2022 | Bowen | G06V 40/10 |

FOREIGN PATENT DOCUMENTS

| | | | | |
|---|---|---|---|---|
| JP | 2000-197782 A | 7/2000 | | |
| JP | 3982015 B2 * | 9/2007 | ............. | D05B 19/02 |

* cited by examiner

SEWING APPARATUS

CROSS-REFERENCE TO RELATED APPLICATIONS

The present application claims the benefit of priority of Japanese Patent Application No. 2020-136438, filed on Aug. 12, 2020, the content of which is incorporated herein by reference.

TECHNICAL FIELD

The present invention relates to a sewing apparatus including a contact operation type display input apparatus.

BACKGROUND

In a sewing apparatus of related art, a control apparatus stores sewing pattern data for performing a specific seam, pattern stitching, or the like, and editing work such as selection of the sewing pattern data, a change of a parameter, or the like is performed from an input apparatus such as a touch panel or the like connected to a storage apparatus (for example, refer to JP-A-9-290083).

SUMMARY

However, in a display input apparatus of the sewing apparatus of related art, a screen configuration is complicated, such that visibility or operability is not sufficient enough.

An object of the present embodiment is to improve visibility and operability.

An aspect of the present embodiment is a sewing apparatus, comprising:

a display input unit including a display unit configured to display an image of an input screen, and an input detection unit configured to detect an input operation on the input screen; and a control apparatus that performs display control of the display unit in response to the input operation, wherein the control apparatus performs display control in which a background of the input screen is set to a dark color as a whole, a sewing pattern image displayed on the input screen is set to brightness higher than that of the background, and an operation unit that receives the input operation on the input screen is set to a color lighter than that of the background.

In the sewing apparatus, the control apparatus may perform display control for increasing brightness of the operation unit on which the input operation is performed.

In the sewing apparatus, the control apparatus may perform display control for changing the color of the operation unit on which the input operation is performed to a color based on blue.

In the sewing apparatus, the control apparatus may additionally display a content display unit indicating a content input from the operation unit at an inside of the operation unit or an outside of the operation unit, and may perform display control in which the content display unit may be set to brightness higher than that of the background.

In the sewing apparatus, the control apparatus may perform display control in which the sewing pattern image is displayed along a longitudinal direction of the input screen, and a plurality of the operation units disposed side by side along the longitudinal direction of the input screen are disposed on both sides of the sewing pattern image.

According to the present embodiment, visibility or operability in a display input unit can be improved.

DESCRIPTION OF EMBODIMENTS

Outline of Embodiments of the Invention

Figure 1:
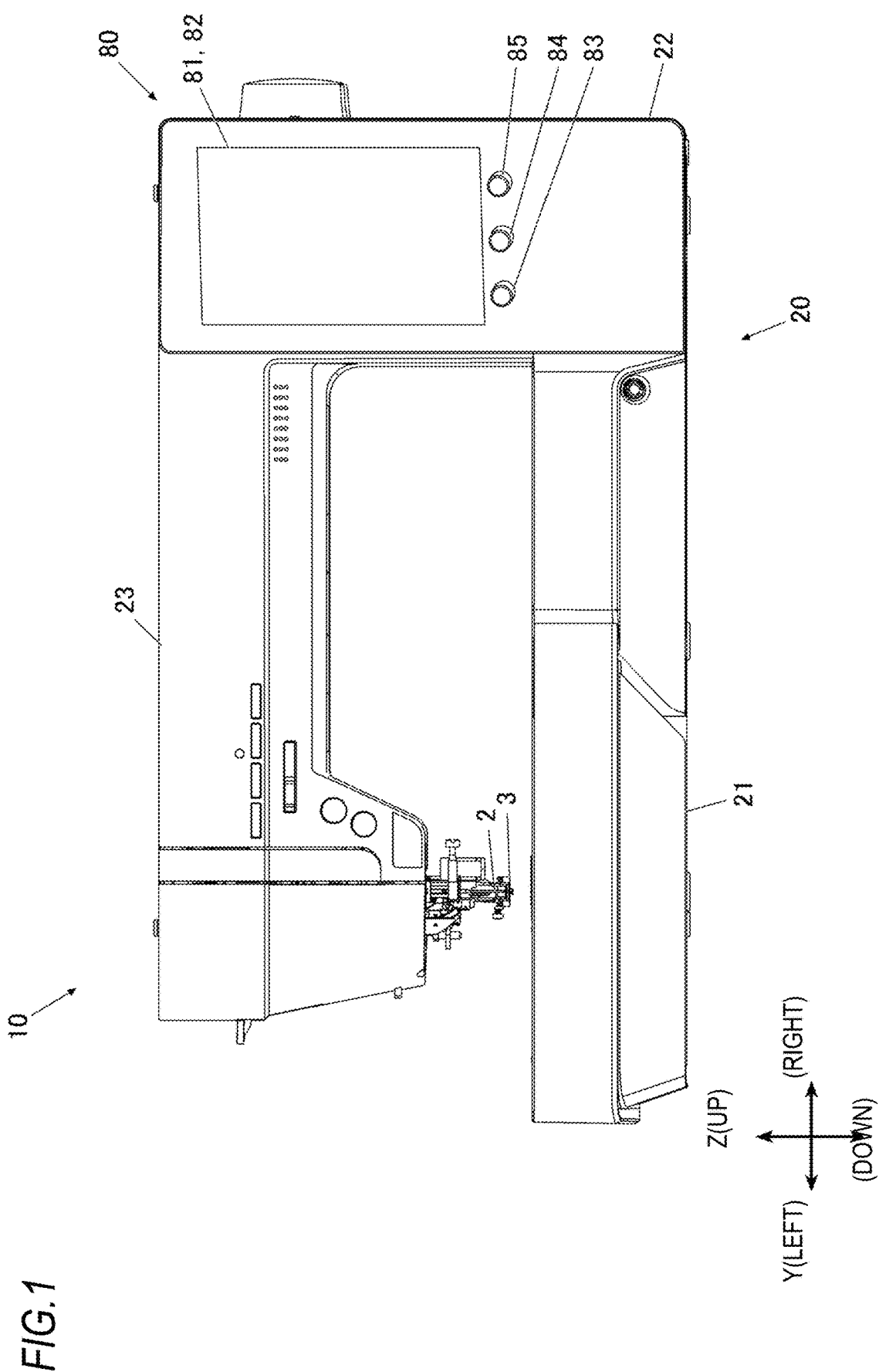
FIG. 1 is a front view of a sewing machine according to an embodiment of the present invention.
Figure 2:
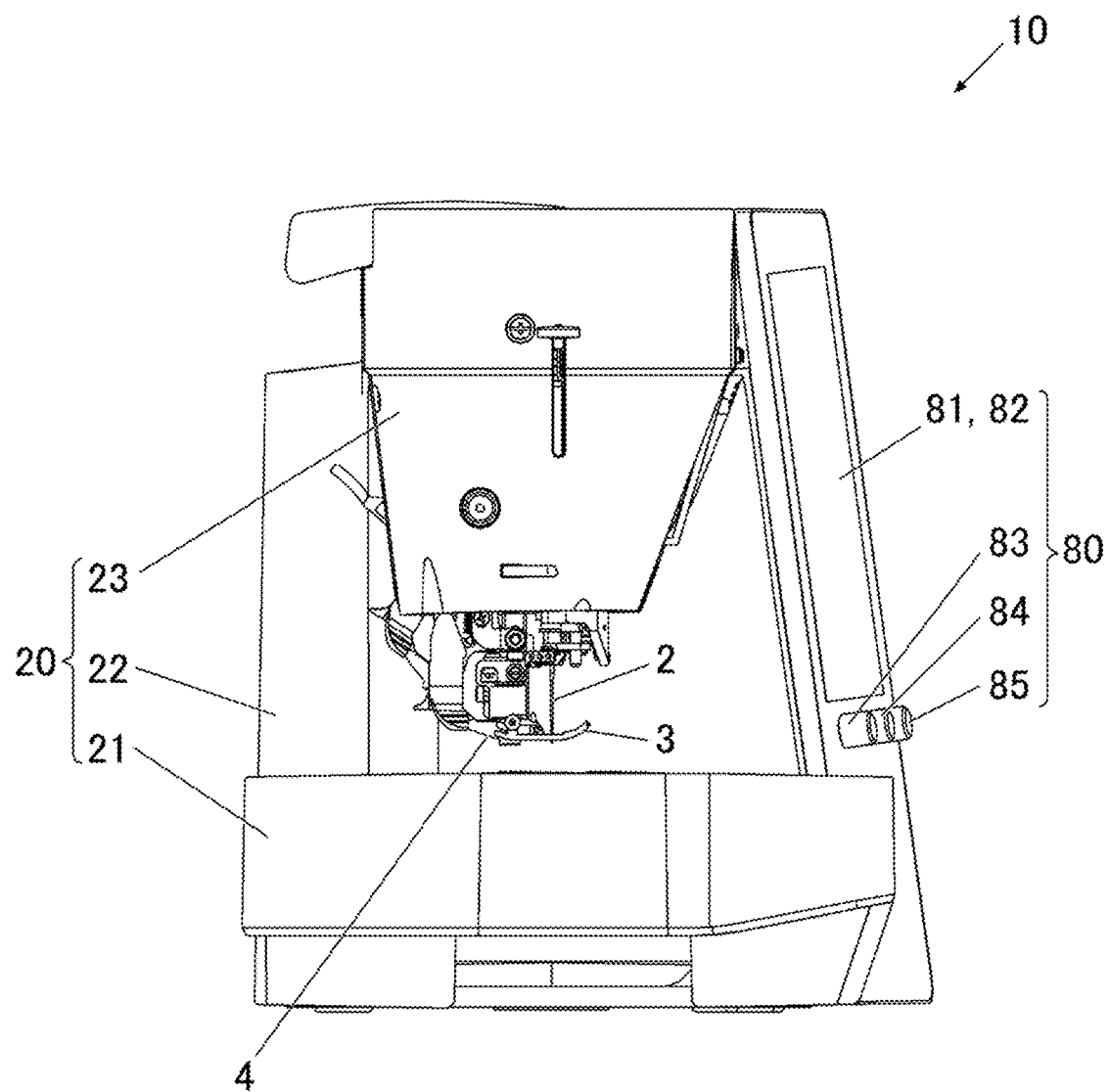
FIG. 2 is a left side view of the sewing machine.
Figure 2:
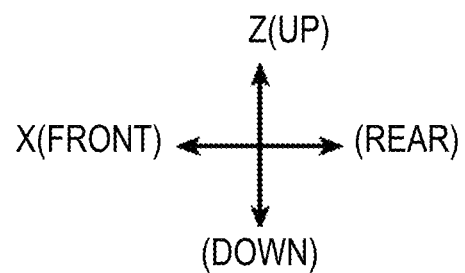
Figure 3:
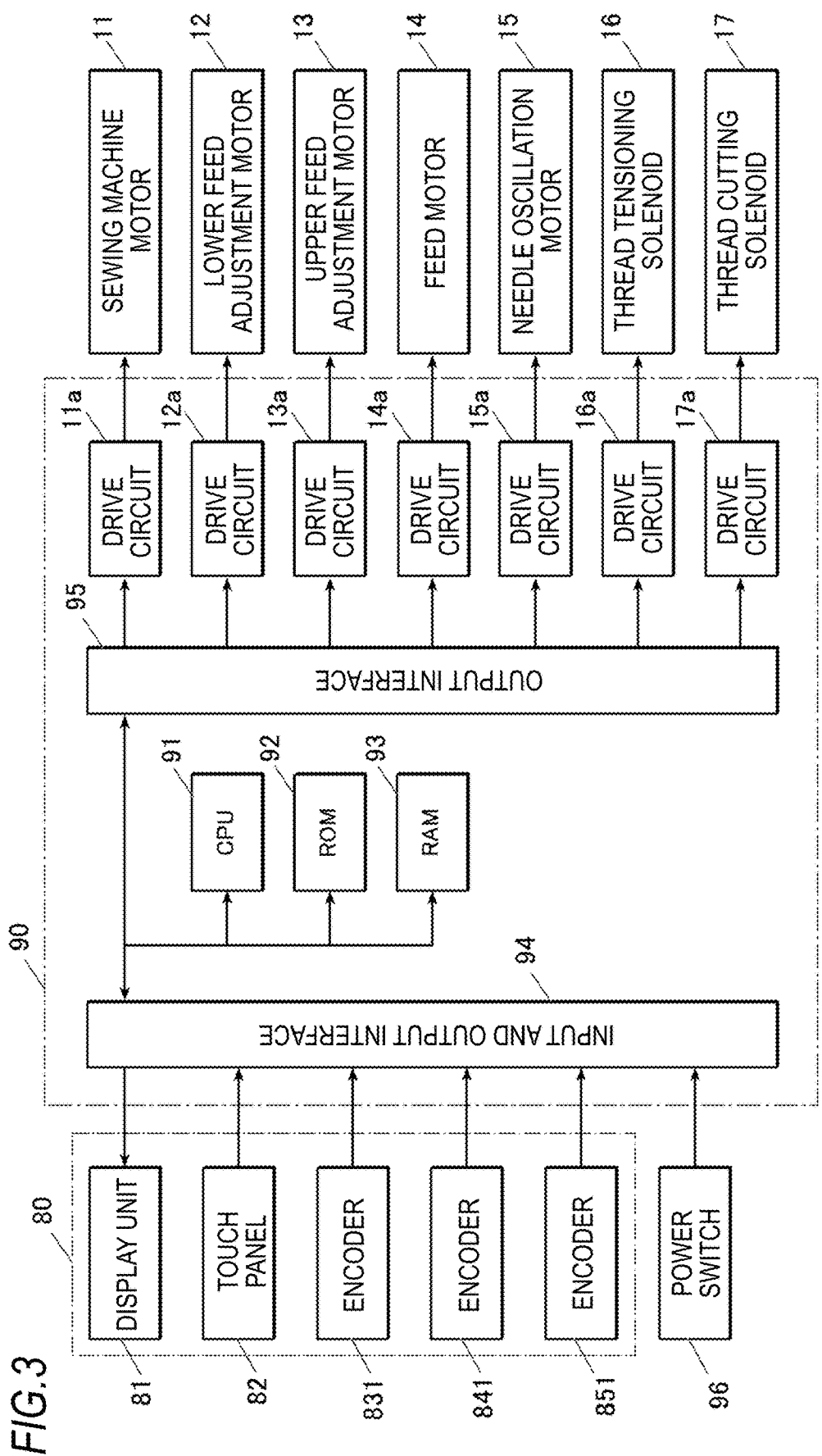
FIG. 3 is a functional block diagram illustrating a control system of the sewing machine.

Hereinafter, a sewing apparatus according to the present embodiment will be described with reference to the drawings. FIG. 1 is a front view of a sewing machine 10 serving as a sewing apparatus, FIG. 2 is a left side view thereof, and FIG. 3 is a functional block diagram illustrating a control system thereof.

The sewing machine 10 includes: a needle vertical movement mechanism that applies vertical movement to a needle bar that holds a sewing needle 2 using a sewing machine motor 11 as a drive source; a lower feed mechanism that uses power of the sewing machine motor 11 to feed a workpiece from under a throat plate by using a feed dog; an upper feed mechanism that feeds the workpiece by an upper feed 4 that contacts the workpiece from above by using the power of the sewing machine motor 11; a shuttle mechanism; a presser foot 3 that presses the workpiece on the throat plate from above; a needle oscillation mechanism that freely and selectively moves the needle bar in a direction orthogonal to a cloth feeding direction; a thread tensioner that applies thread tension to a needle thread that passes through the sewing needle 2; a thread take-up lever for pulling up the needle thread; a thread cutting apparatus for cutting a sewing end end portion of the needle thread and a bobbin thread; a display input apparatus 80 serving as a display input unit that displays various information related to sewing and receives an input of various settings; a control apparatus 90 that controls an operation of each configuration of the sewing machine 10; and a sewing machine frame 20 that stores or supports each configuration of the sewing machine 10.

In the following description, a horizontal direction parallel to a direction in which the lower feed mechanism feeds the workpiece is defined as an X-axis direction, and a downstream side in a feeding direction of the workpiece is defined as "front" and an upstream side in the feeding direction thereof is defined as "rear". A direction that is horizontal and orthogonal to the X-axis direction is defined as a Y-axis direction, a left hand side facing forward is defined as "left", and a right hand side facing forward is defined as "right". A direction orthogonal to the X-axis direction and the Y-axis direction is defined as a Z-axis direction, and one of which is defined as "up" and the other is defined as "down".

The sewing machine frame 20 includes: a sewing machine bed portion 21 extending along the Y-axis direction; an upright body portion 22 raised from a right end portion of the sewing machine bed portion 21; and a sewing machine arm portion 23 extending to the left along the Y-axis direction from an upper end portion of the upright body portion 22.

The needle bar for holding the sewing needle 2, the presser foot 3, and the upper feed 4 are supported at a lower left end portion of the sewing machine arm portion 23.

A rectangular display screen of the display input apparatus 80 is disposed on a front surface side of the upright body portion 22. A front surface of the upright body portion 22 and the display screen of the display input apparatus 80 which is flush with the front surface are formed of an inclined surface in which an upper side and a left side of an X-Z plane are slightly inclined rearward.

The display screen of the display input apparatus 80 is easily visible, by the above-described inclined surface, to an operator of the sewing machine who works facing a stitch point location of the sewing machine 10 from the rear.

An upper surface of the sewing machine bed portion 21 is a smooth surface along an X-Y plane, and the throat plate, which is not illustrated, is disposed to be flush with the upper surface of the sewing machine bed portion 21 at the stitch point location of the sewing needle 2.

Since the needle vertical movement mechanism is the same as a well-known mechanism, detailed description thereof will be omitted. The needle vertical movement mechanism can move the needle bar up and down by a crank mechanism by using the sewing machine motor 11 built in the sewing machine as the drive source.

Since the needle oscillation mechanism is the same as a well-known mechanism, detailed description thereof will be omitted. The needle oscillation mechanism includes a support frame that supports the needle bar so as to be able to move up and down, and a needle oscillation motor 15 that freely and selectively moves a tip portion of the needle bar along the Y-axis direction via the support frame.

Since a shuttle mechanism is the same as a well-known mechanism, detailed description thereof will be omitted. The shuttle mechanism includes a shuttle that rotates by receiving power from the sewing machine motor 11 on a lower side of the throat plate, and catches a loop of the needle thread from the descending sewing needle 2 and entangles the bobbin thread to form a seam on the workpiece.

The thread take-up lever receives power from the sewing machine motor 11 and moves up and down in the same cycle as that of the stitch point. The needle thread directed toward the sewing needle is hung on the thread take-up lever, and when the shuttle forms a seam between the needle thread and the bobbin thread, the needle thread is pulled up to fasten the seam therebetween.

Since the lower feed mechanism is the same as a well-known mechanism, detailed description thereof will he omitted. The lower feed mechanism includes the feed dog that allows a tooth tip to partially protrude out from an opening portion of the throat plate, extracts reciprocating motion in the X-axis direction and reciprocating motion in the Z-axis direction from the sewing machine motor 11, and applies the extracted reciprocating motion to the feed dog. Accordingly, the feed dog performs an oval motion around a Y-axis whose longitudinal direction is along the X-axis direction. Next, when the feed dog passes through an upper portion of a trajectory of the oval motion, the feed dog moves forward while the tooth tip protrudes upward from the opening portion of the throat plate, and feeds the workpiece on the throat plate forward.

The lower feed mechanism includes a lower feed adjustment motor 12 that adjusts a stroke width of the reciprocating motion in the X-axis direction transmitted from the sewing machine motor 11, and can freely and selectively adjust a feed amount of the workpiece by the feed dog.

Since the upper feed mechanism is the same as a well-known mechanism, detailed description thereof will be omitted. The upper feed mechanism includes an upper feed that abuts on, from above, the workpiece provided at the stitch point location above the throat plate and that performs a feed motion, extracts the reciprocating motion in the X-axis direction and the reciprocating motion in the Z-axis direction from the sewing machine motor 11, and applies the extracted reciprocating motion to the upper feed. Accordingly, the upper feed performs the oval motion around the Y-axis whose longitudinal direction is along the X-axis direction. Next, when the upper feed passes through a lower portion of the trajectory of the oval motion, a tip portion thereof moves forward along an upper surface of the throat plate, and feeds the workpiece on the throat plate forward.

The upper feed mechanism includes an upper feed adjustment motor 13 that adjusts the stroke width of the reciprocating motion in the X-axis direction transmitted from the sewing machine motor 11, and can freely and selectively adjust the feed amount of the workpiece by the feed dog.

The upper feed can be switched, by a manual operation, between a retract location where the feed is not performed and a feed location where the feed is performed, such that it is possible to select whether or not to execute the upper feed. A sensor for detecting whether the upper feed is located at the retract location or the feed location may be provided, and a detected signal may be configured to be input to the control apparatus 90.

The presser foot 3 is provided above the stitch point location of the throat plate, and can press the workpiece from above. The presser foot 3 is attached to a lower end portion of a presser bar that is suspended and supported from a lower left end portion of the sewing machine arm portion 23. A spring pressure is applied to the presser bar in the sewing machine arm portion 23, and the presser foot 3 is pressed toward the throat plate side to apply a pressing pressure to the workpiece.

A plurality of types of presser foot 3 are provided, and can be replaced with an appropriate presser foot 3 according to a type of sewing.

The presser bar can retract the presser foot 3 upward by a manual lever or a feed motor 14 which are not illustrated. The feed motor 14 can freely and selectively adjust the pressing pressure of the presser foot.

Since the thread tensioner is the same as a well-known mechanism, detailed description thereof will be omitted. Although not illustrated herein, the thread tensioner clamps the needle thread in the middle of a path of the needle thread and applies tension to the needle thread by a clamping pressure. In the thread tensioner, the clamping pressure can be adjusted by a thread tensioning solenoid 16, whereby any thread tension can be applied to the needle thread.

Since the thread cutting apparatus is the same as a well-known mechanism, detailed description thereof will be omitted. The thread cutting apparatus includes a knife that operates between the throat plate and the shuttle mechanism, and cuts the needle thread and the bobbin thread. The thread cutting apparatus includes a thread cutting solenoid 17 for operating the knife.

The display input apparatus 80 includes: a display unit 81 provided on a front surface side of the upright body portion 22 of the sewing machine frame 20; a touch panel 82 provided to overlap a front side of the display unit 81; and three dials 83, 84, and 85 provided side by side in an approximately Y-axis direction directly below the display unit 81.

The display unit 81 is formed of a liquid crystal display and an organic electro luminescence (EL), and displays an input screen G1, which will be described later, by display control performed by the control apparatus 90. The touch panel 82 functions as an input detection unit that detects a contact input location by an operator of the sewing machine and detects an input operation on the input screen G1.

The three dials 83, 84, and 85 respectively include built-in encoders 831, 841, and 851, and an amount of rotation operation by the operator is input to the control apparatus 90 through the encoder 831, 841, and 851.

[Control System of Sewing Machine]

Next, a configuration of a control system of the sewing machine 10 will be described with reference to FIG. 3.

The control apparatus 90 of the sewing machine 10 includes: a ROM 92 that stores various programs for performing various control and processing, which will be described later, sewing pattern data for performing various sewing, and other various setting data; a CPU 91 that executes the various programs stored in the ROM 92; a RAM 93 serving as a work area when the various programs are executed; and an input and output interface 94 and an output interface 95 connected to each other via the CPU 91, the ROM 92, and the RAM 93, and a bus.

The output interface 95 is connected to the sewing machine motor 11, the lower feed adjustment motor 12, the upper feed adjustment motor 13, the feed motor 14, the needle oscillation motor 15, the thread tensioning solenoid 16, and the thread cutting solenoid 17 via drive circuits 11a, 12a, 13a, 14a, 15a, 16a, and 17a. The CPU 91 can perform operation control thereof.

Each configuration of the display input apparatus 80 and a power switch 96 are connected to the input and output interface 94.

The sewing machine 10 can control, by the control apparatus 90, a front and rear feed amount by the lower feed adjustment motor 12 and a left and right needle oscillation amount by the needle oscillation motor 15, and can perform the stitch point at any location on the X-Y plane with respect to the workpiece.

The sewing pattern data is formed of data indicating a plurality of stitch point locations on the X-Y plane determined according to the sewing pattern.

The control apparatus 90 reads the sewing pattern data, and controls the lower feed adjustment motor 12 and the needle oscillation motor 15, thereby making it possible to perform sewing that forms a seam in accordance with the sewing pattern.

[Display Control of Display Input Apparatus]

Display control of the display input apparatus 80 performed by the control apparatus 90 will be described. All processing performed by the display control of the display input apparatus 80 and an input thereof, which will be described below, is performed by allowing the CPU 91 of the control apparatus 90 to execute the program in the ROM 92.

Figure 4:
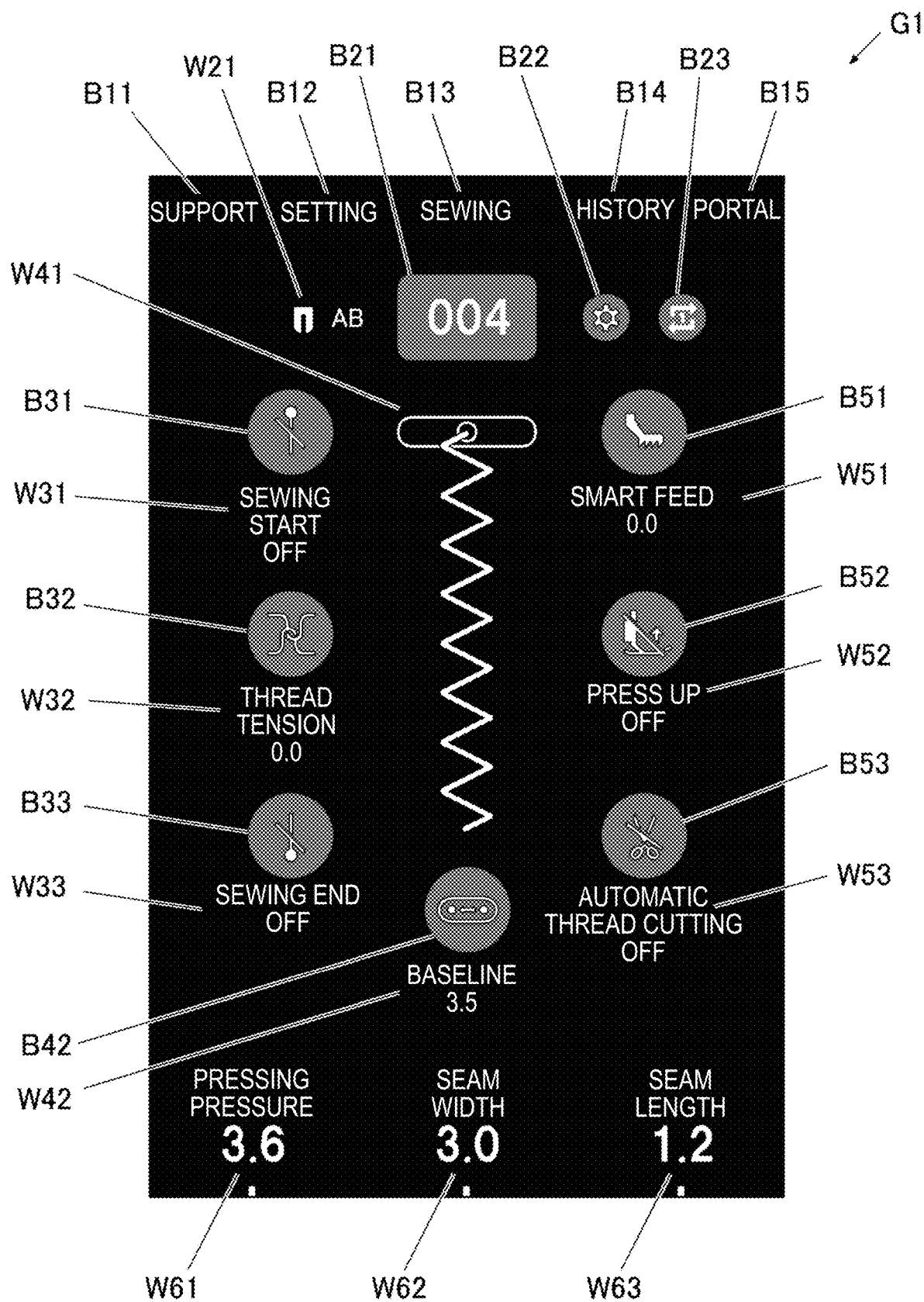
FIG. 4 is an explanatory diagram illustrating a display example of an input screen displayed on a display unit of a display input apparatus.
Figure 5:
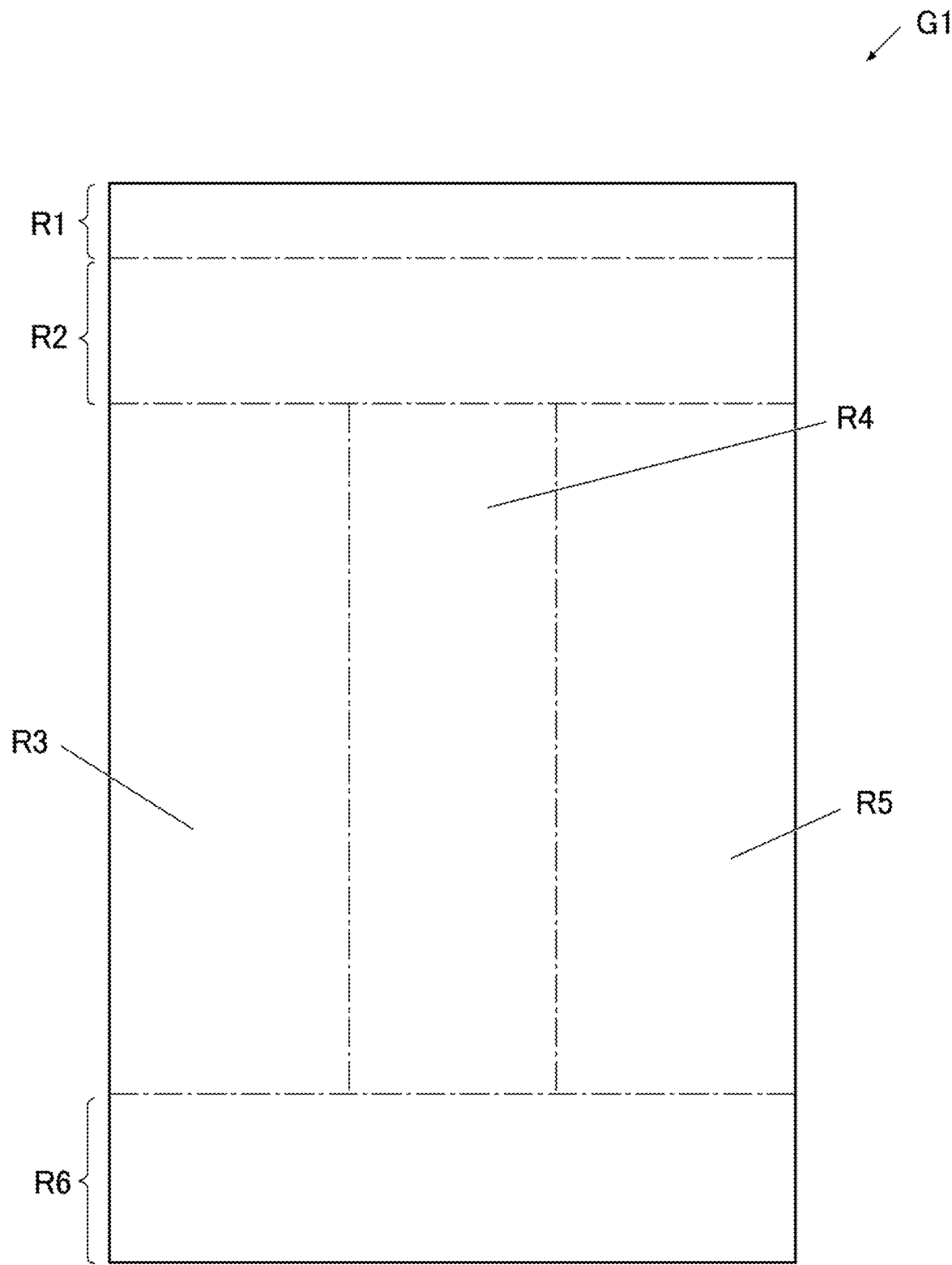
FIG. 5 is an explanatory diagram illustrating sections of a plurality of display areas on the input screen with virtual lines.

FIG. 4 is an explanatory diagram illustrating a display example of the input screen G1 displayed on the display unit 81 of the display input apparatus 80, and FIG. 5 is an explanatory diagram illustrating sections of a plurality of display areas of the input screen G1 with virtual lines. In the explanatory diagram illustrating these display examples and an explanatory diagram illustrating other display examples which will be described later, the up, down, left, and right on a paper surface approximately coincide with the up, down, left, and right on the sewing machine 10.

As illustrated in the drawing, the input screen G1 is a vertically long rectangle as a whole, and is divided into a first area R1 extending over the whole left and right width of an upper end portion of the screen, a second area R2 which is disposed below the first area R1 and extends over the whole left and right width, third to fifth areas R3 to R5 disposed below the second area R2, and a sixth area R6 extending over the whole left and right width of a lower end portion of the screen.

The third to fifth areas R3 to R5 are vertically long rectangular areas formed by dividing an area between the second area R2 and the sixth area R6 into three areas to the left and right, and the left side forms the third area R3, the center forms the fourth area R4, and the right side forms the fifth area R5.

In the example of FIG. 5, the third to fifth areas R3 to R5 are divided into three equal parts in a left and right direction, but the embodiment is not limited thereto and individual ratios can be increased or decreased. For example, even though left and right widths of the central fourth area R4 may be changed in a range of ¼ to ½ of a total width, and left and right widths of the third area R3 and the fifth area R5, which are provided on opposite sides of the fourth area R4, may be equal to each other.

In the first area R1, for switching to various input screens, a support button B11, a setting button B12, a sewing button B13, a history button B14, and a portal button B15, which are formed of character string displays, are disposed side by side in order from the left to the right.

A touch input of each of these buttons B11 to B15 can be performed by performing a touch operation with respect to each button location. The locations of the respective buttons B11 to B15 can be scrolled by swiping the first area R1 to the left and right.

The support button B11 is a button for switching a display to a support screen for displaying an operation manual or the like of the sewing machine 10.

The setting button B12 is a button for switching the display to a setting screen for performing settings or the like related to surrounding environments of the sewing machine 10 such as setting brightness of work light which is not illustrated, setting a speaker volume which is not illustrated, or the like.

The sewing button B13 is a button for switching the display to the input screen G1 of FIG. 4. The input screen G1 can perform various settings related to sewing.

The history button B14 is a button for switching the display to a history screen which is not illustrated. The history screen is an input screen for calling up record data related to sewing pattern data and settings at the time of performing the sewing with respect to a plurality of sewing patterns whose sewing was performed in the past.

The portal button B15 is a button for switching the display to a browser screen for being connected to a portal site of the sewing machine 10 through a network line.

In the second area R2, a presser foot candidate display frame W21 formed of a pattern and a character string display, a sewing pattern selection button B21 serving as an operation unit for switching to various display screens, a sewing pattern setting button B22, and a cycle selection button B23 are disposed side by side in order from the left.

In the presser foot candidate display frame W21, the type of presser foot 3 suitable for the currently selected sewing pattern is displayed. For example, in the example of FIG. 4. pattern information and character information indicating that a presser foot A and a presser foot B are suitable for the selected sewing pattern are displayed.

The sewing pattern selection button B21 is set with a contact range of an approximately rectangular shape, and when a user touches the sewing pattern selection button B21 within the contact range of the sewing pattern selection button B21, the display is switched to a sewing pattern selection screen. A plurality of types of sewing patterns are registered in the control apparatus 90, and a pattern number is determined for each of the sewing patterns. When the pattern number is selected and determined on the selection screen, the selected pattern number is displayed within the contact range of the approximately rectangular shape of the selection button B21.

The sewing pattern setting button B22 is set with a contact range of a circular shape, and an icon indicating a setting button is displayed inside the contact range of the circular shape. When the user touches the setting button B22 within the contact range of the setting button B22, the display is switched to a predetermined setting screen. From the setting screen, it is possible to perform a setting related to a sewing pattern other than a parameter to be set by buttons B31 to B53 which will be described later. For example, from the setting screen, pattern editing such as vertical inversion of the sewing pattern, left-right inversion thereof, or the like can be performed.

The cycle selection button B23 is set with a contact range of a circular shape, and an icon indicating a cycle selection button is displayed inside the contact range of the circular shape. When the user touches the cycle selection button B23 within the contact range of the cycle selection button B23, it is possible to set whether to perform any one of single sewing in which sewing for one sewing pattern is performed or continuous sewing in which repeated sewing is performed. With respect to the cycle selection button B23, the display control is performed so that when the single sewing is set, a number "1" is displayed inside the icon, and when the repeated sewing is being selected, the number inside the icon is erased.

In each of the third area R3 and the fifth area R5, three buttons on the top and bottom, which are buttons serving as operation units for performing a predetermined setting for the sewing pattern, are provided side by side.

In the third area R3, the sewing start processing setting button B31, the thread tension setting button B32, and the sewing end processing setting button B33 are disposed side by side in order from the top.

In the fifth area R5, the upper feed setting button B51, the press-up setting button B52, and the thread cutting setting button B53 are disposed side by side in order from the top.

The various setting buttons B31, B32, B33, B51, B52, and B53 are set with a contact range of a circular shape, and an icon serving as a content display unit indicating a content to be input from each setting button is displayed inside the setting buttons B31 to B53.

On a lower outer side portion of various setting buttons B31, B32, B33, B51, B52, and B53, setting information display units W31, W32, W33, W51, W52, and W53 are respectively disposed as content display units that indicate the content to be input from each setting button and a set value thereof or a setting state thereof with character information.

The sewing start processing setting button B31 is a button for selecting whether or not to execute a lock stitch at a start end portion of sewing and a type of the lock stitch. For example, by repeatedly touching the contact range of the sewing start processing setting button B31, it is possible to switch the setting of a reverse stitch, a French knot stitch, and a non-lock stitch.

The thread tension setting button B32 is a button for freely and selectively setting thread tension of a thread tension apparatus by the thread tensioning solenoid 16. When the user touches the thread tension setting button B32 within the contact range of the thread tension setting button B32, a thread tension input screen is displayed, and the thread tension can be set by an input operation on the screen or an input operation by rotation of the dial 84.

The sewing end processing setting button B33 is a button for selecting whether or not to execute a lock stitch at an end end portion of sewing and the type of the lock stitch. For example, by repeatedly touching the contact range of the sewing end processing setting button B33, it is possible to switch the setting of the reverse stitch, the French knot stitch, and the non-lock stitch.

The upper feed setting button B51 is a button for setting whether or not to execute the upper feed by the upper feed 4 and an upper feed amount (a difference value with respect to a lower feed amount by the feed dog). When the user touches the upper feed setting button B51 within the contact range of the upper feed setting button B51, the setting of whether or not the upper feed is executed is switched. When the setting that the upper feed is executed is performed, an input screen of the upper feed amount is displayed, and the upper feed amount can be set by the input operation on the screen or the input operation by the rotation of the dial 84.

The press-up setting button B52 is a button for setting whether or not to automatically raise the presser foot 3 to release the workpiece at the end of sewing of the sewing pattern. When the user touches the press-up setting button B52 within the contact range of the press-up setting button B52, it is possible to switch the setting of whether or not to automatically raise the presser foot 3.

The thread cutting setting button B53 is a button for setting whether or not to automatically execute thread cutting by the thread cutting apparatus at the end of sewing of the sewing pattern. When the user touches the thread cutting setting button B53 within the contact range of the thread cutting setting button B53, it is possible to switch the setting of whether or not to execute automatic thread cutting.

In the fourth area R4, a pattern image display frame W41 for displaying an image of a currently selected sewing pattern and a baseline location setting button B42 serving as an operation unit are disposed side by side in order from the top.

In the pattern image display frame W41, a sewing pattern image formed of the currently selected sewing pattern is displayed. The sewing pattern image is a moving image linked to a sewing operation, and a stitch point location in the left and right direction in which the stitch point is currently performed is displayed at an upper end portion of the image. On a lower side of the stitch point location, a seam formed at a stitch point location where the stitch point is to be performed from now on is displayed. The sewing pattern image is formed of a moving image in which a seam for one stitch moves upward every time one stitch point is performed.

A shape of the sewing pattern image varies depending on a setting value of a seam length and a seam width which will be described later.

The baseline location setting button B42 is set with a contact range of a circular shape, and an icon serving as a content display unit indicating a content to be input from the baseline location setting button B42 is displayed inside the baseline location setting button B42.

A baseline is a reference line of the sewing pattern along a cloth feeding direction, and a needle oscillation amount at each stitch point location of the sewing pattern is determined based on the baseline.

When the user touches the baseline location setting button B42 within the contact range of the baseline location setting button B42, an input screen of a baseline location is displayed, and the baseline location can be set by the input operation on the screen or the input operation by the rotation of the dial 84.

At a lower outer side portion of the baseline location setting button B42, a setting information display unit W42 serving as a content display unit indicating a content to be input from the button and a setting value thereof with character information is disposed.

In the sixth area R6, a pressing pressure display unit W61 that numerically displays a setting value of a pressing pressure by the presser foot 3, a seam width display unit W62 that numerically displays a setting value of a horizontal width of the needle oscillation of the sewing pattern, and a seam length display unit W63 that numerically displays a setting value of a space (a sewing pitch) in the cloth feeding direction for each stitch are disposed side by side in order from the left.

The pressing pressure display unit W61, the seam width display unit W62, and the seam length display unit W63 are respectively disposed so as to be directly above the dials 83, 84, and 85.

The pressing pressure is set based on an input rotation amount of the dial 83 detected by the encoder 831, and a setting value of the input pressing pressure is numerically displayed on the pressing pressure display unit W61.

The seam width is set based on an input rotation amount of the dial 84 detected by the encoder 841, and a setting value of the input seam width is numerically displayed on the seam width display unit W62.

The seam length is set based on an input rotation amount of the dial 85 detected by the encoder 851, and a setting value of the input seam length is numerically displayed on the seam length display unit W63.

Figure 6:
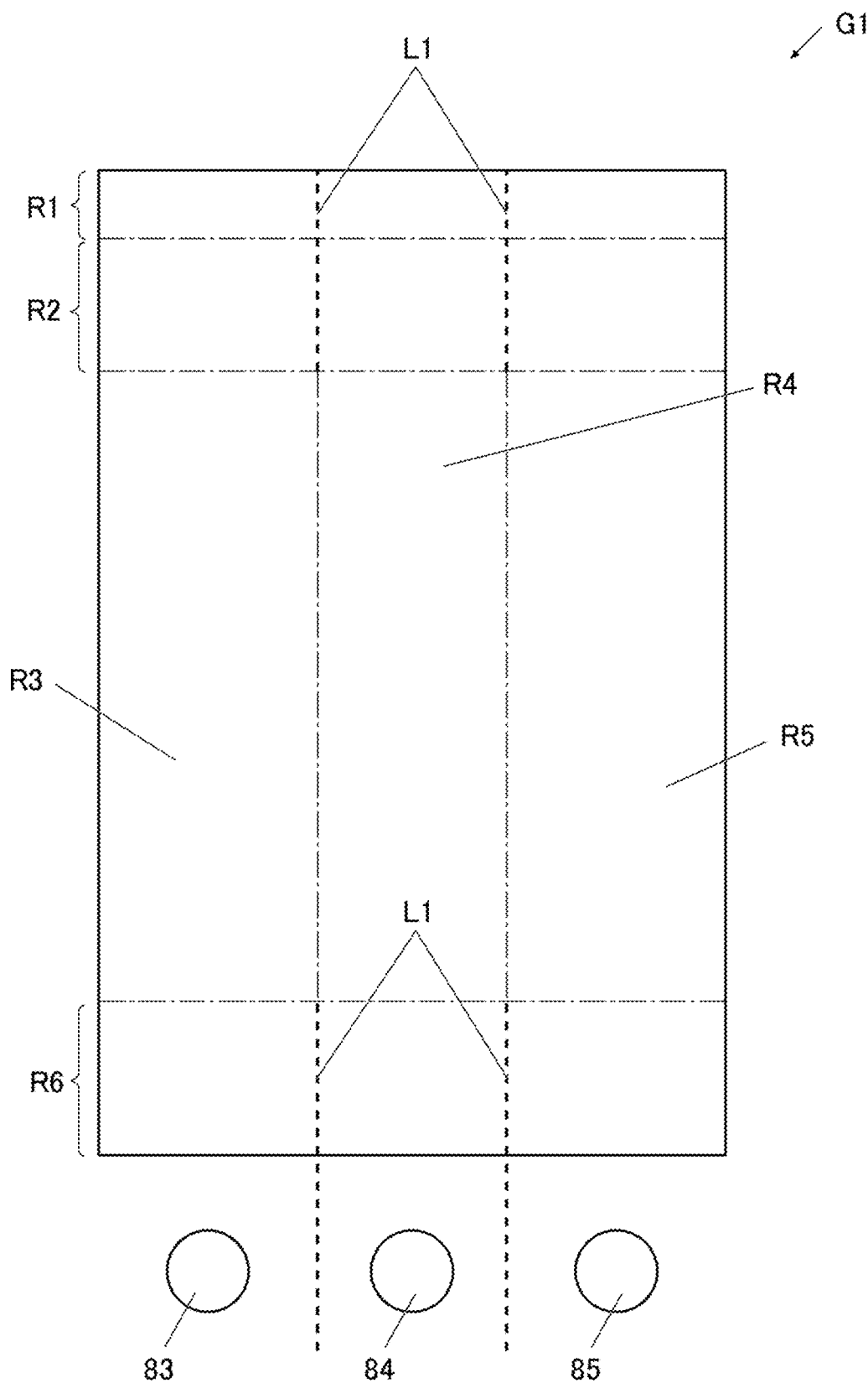
FIG. 6 is a detailed explanatory diagram illustrating sections of a plurality of display areas on the input screen with virtual lines.

As illustrated in FIG. 6, the first area R1, the second area R2, and the sixth area R6 are divided into three by a vertical virtual line L1 (a dotted line in FIG. 6) which is a virtual extension line of a boundary of the third area R3, the fourth area R4, and the fifth area R5 divided in the left and right direction, and B11 to B15, B21 to B23, W21, and W61 to W63, which are the above-described respective display configurations, are disposed in the divided areas.

In the first area R1, as described above, the support button B11, the setting button B12, the sewing button B13, the history button B14, and the portal button B15, which are formed of the character string displays, are disposed side by side in order from the left to the right. The sewing button B13 is disposed at a location (a center location in the left and right direction) divided by the vertical virtual line L1 corresponding to the fourth area R4, the support button B11 and the setting button B12 are disposed at a location (a left location in the left and right direction) divided by the vertical virtual line L1 corresponding to the third area R3, and the history button B14 and the portal button B15 are disposed at a location (a right location in the left and right direction) divided by the vertical virtual line L1 corresponding to the fifth area R5.

When the first area R1 is swiped to the left and right and the locations of the respective buttons B11 to B15 are scrolled, for example, any one of B11 to B15 may be surely disposed at the location (the center location in the left and right direction) divided by the vertical virtual line L1 corresponding to the fourth area R4, and other configurations may be displayed so as to be evenly distributed to a side of the third area R3 and a side of the fifth area R5 divided by the vertical virtual line L1.

In the second area R2, the selection button B21 is disposed at a location (a center location in the left and right direction) divided by the vertical virtual line L1 corresponding to the fourth area R4, the presser foot candidate display frame W21 is disposed at a location (a left location in the left and right direction) divided by the vertical virtual line L1 corresponding to the third area R3, and the setting button B22 and the cycle selection button B23 are disposed at a location (a right location in the left and right direction) divided by the vertical virtual line L1 corresponding to the fifth area R5.

In the sixth area R6, the seam width display unit W62 is disposed at a location (a center location in the left and right direction) divided by the vertical virtual line L1 corresponding to the fourth area R4, the pressing pressure display unit W61 is disposed at a location (a left location in the left and right direction) divided by the vertical virtual line L1 corresponding to the third area R3, and the seam length display unit W63 is disposed at a location (a right location in the left and right direction) divided by the vertical virtual line L1 corresponding to the fifth area R5.

In the dials 83 to 85 as well, by the vertical virtual line L1, the dial 84 is disposed at a location (a center location in the left and right direction) divided by the vertical virtual line L1 corresponding to the fourth area R4, the dial 83 is disposed at a location (a left location in the left and right direction) divided by the vertical virtual line L1 corresponding to the third area R3, and the dial 85 is disposed at a location (a right location in the left and right direction) divided by the vertical virtual line L1 corresponding to the fifth area R5.

[Display Control of Input Screen]

Figure 7:
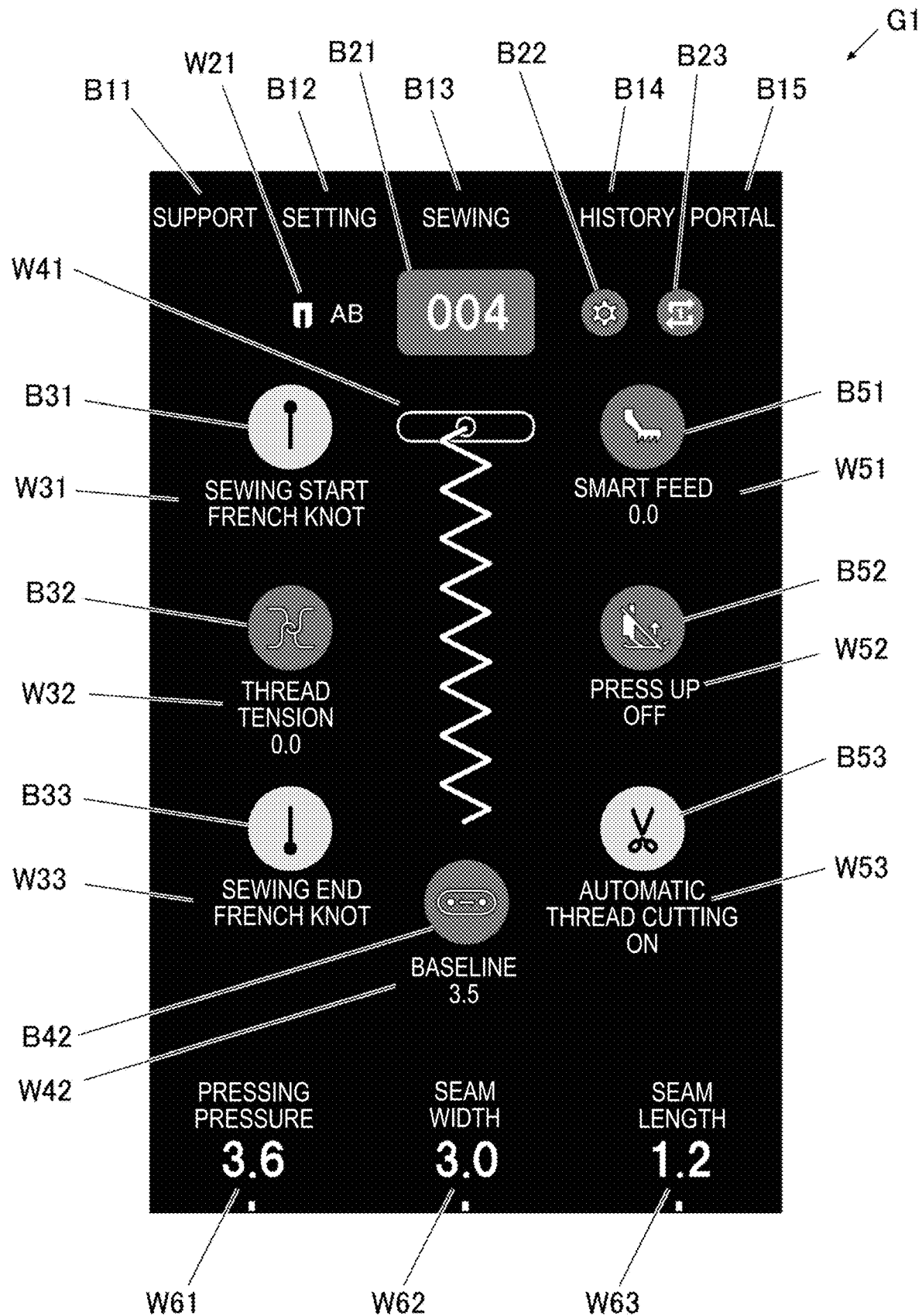
FIG. 7 is an explanatory diagram illustrating a display example of the input screen after an input operation is performed on a specific button.

Next, characteristic display control for the input screen G1 performed by the control apparatus 90 will be described with reference to FIGS. 4 to 7. FIG. 7 is an explanatory diagram illustrating a display example of the input screen G1 after an input operation is performed on a specific button.

In the input screen G1 of FIG. 4 described above, the record data related to the setting of the sewing pattern selected by the selection button B21 remains default data in an initial setting state, and the input screen G1 when the setting is not changed is shown.

In this case, the control apparatus 90 performs the following display control.

The input screen G1 is displayed in the whole display range of the display unit 81, and a background of the input screen G1 is displayed with a dark color (for example, black) as a whole.

The sewing pattern image displayed in the pattern image display frame W41 of the input screen G1 is displayed with a light color (for example, white), the brightness of which is higher than that of the background.

The pattern information and character information of the presser foot 3 in the presser foot candidate display frame W21, the icons in the respective buttons B21, B22, B23, B31, B32, B33, B42, B51, B52, and B53, the character information and setting numerical values of the respective display units W31, W32, W33, W42, W51, W52, W53, W61, W62, and W63 are also displayed with a light color (for example, white), the brightness of which is higher than that of the background. The pattern information and character information thereof, the icons therein, and the character information and setting numerical values thereof may have the same brightness as that of the sewing pattern image.

The character string displays of the support button B11, the setting button B12, the sewing button B13, the history button B14, and the portal button B15 are also displayed with a light color (for example, gray), the brightness of which is higher than that of the background. The character string display of the currently selected button ("the sewing button B13" in FIG. 4) of the buttons B11 to B15 is displayed with brightness brighter than that of the buttons of the buttons B11 to B15, which are not selected.

The character string display of the selected button may be set to the same brightness as that of the sewing pattern image.

The contact ranges of the respective buttons B21, B22, B23, B31, B32, B33, B42, B51, B52, and B53 are displayed with a light color (for example, gray), the brightness of which is higher than that of the background. With respect to each of the buttons B21 to B53, since an operator of the sewing machine only needs to visually recognize the location of each button, a difference in brightness between the background and the button may not be large. When the brightness of the button is increased, it becomes difficult to identify the icon inside the button, such that the contact range is displayed with brightness which is identifiable with the background and is sufficiently lower than that of the icon inside the button.

On the other hand, the control apparatus 90 performs the following display control on the input screen G1 after the input operation is performed on the specific button.

Specifically, when the input operation is performed on any one of the buttons B22, B23, B31, B32, B33, B41, B51, B52, and B53 and the default data thereof is changed, the contact range of the changed button is changed to be displayed with higher brightness. The contact range of the changed button is changed to be displayed with a color based on blue.

FIG. 7 illustrates a case in which the input operation is performed on the sewing start processing setting button B31, the sewing end processing setting button B33, and the thread cutting setting button B53 such that the default data thereof is changed.

Accordingly, it can be recognized at a glance that a setting content is changed from the default data with respect to the parameter determined by the button.

The icon within the contact range of the button, the display of which is changed to higher brightness, is changed from the light color (for example, white), the brightness of which is higher than that of the background, to the dark color (for example, black). Accordingly, it is possible to easily identify the icon within the contact range of the button having the high brightness.

Technical Effect in Embodiments of the Invention

As described above, the control apparatus 90 of the sewing machine 10 performs the display control in which the background of the input screen G1 is set to the dark color as a whole, the sewing pattern image displayed in the pattern image display frame W41 of the input screen G1 is set to brightness higher than that of the background, and the respective buttons B21 to B53 that receive the input operations on the input screen G1 are set to the color lighter than that of the background.

Since the background of the input screen G1 is dark as a whole in this manner, it is easier to see a display content than a case where the input screen G1 is bright as a whole, such that eye fatigue is reduced, a burden on the operator is reduced, and visibility and operability are improved, thereby making it possible to smoothly perform setting work and improve workability.

Since the sewing pattern image is displayed with brightness higher than that of the background in a state where the dark color is used for the background, the sewing pattern image can be clearly recognized, and the operator of the sewing machine can accurately grasp the currently selected sewing pattern.

Since the sewing pattern image is the moving image that is linked to the sewing operation, in which the seam for one stitch moves upward every time one stitch point is performed, it is possible to accurately grasp a progress state of the current sewing by performing clear display as described above.

The sewing pattern image is such a moving image, such that even when the setting content is confirmed by looking at the input screen G1 during the sewing, it is possible to grasp the progress state of the sewing from the moving image even in a state where the user takes the eyes off the actual sewing needle 2, and the setting content during the sewing can be satisfactorily confirmed.

Since each of the buttons B21 to B53 is displayed with the color lighter than that of the background in the input screen G1, the location of each of the buttons B21 to B53 can be easily grasped. Therefore, the setting work using the buttons B21 to B53 can be smoothly performed, such that the workability can be improved.

When the brightness of each of the buttons B21 to B53 is lower than that of the sewing pattern image, it is possible to avoid damaging the sharpness of the sewing pattern image. The buttons B21 to B53 disposed in the respective locations on the input screen G1 prevent the whole screen from becoming complicated, such that the display content is easy to be seen, the burden on the operator can be reduced, the setting work can be smoothly performed, and the workability can be further improved.

The control apparatus 90 performs the display control for increasing the brightness of the contact range of the buttons B22 to B53 on which the input operation is performed.

Accordingly, it is possible to clearly grasp which of the various parameters set in the sewing pattern is changed.

Particularly, the control apparatus 90 performs the display control for changing the color of the contact range of the buttons B22 to B53, on which the input operation is performed, to the color based on blue.

In this case, even when the sewing machine operator tends to have low color vision recognition ability, it is possible to clearly grasp the parameter whose setting is changed.

Deterioration in the color vision recognition ability is likely to occur mainly with respect to distinguishment between red and green. As described above, even when the deterioration in distinguishment ability between red and green occurs, the color based on blue can be easily recognized. Therefore, even the operator whose color vision recognition ability deteriorates can easily recognize that the color of the button is changed to the color based on blue, such that more people can grasp which of the parameters is changed.

The control apparatus 90 displays the icon inside the buttons B22 to B53, additionally displays the setting information display units W31 to W53 on the outside of the buttons B31 to B53, and performs the display control for allowing the buttons B22 to B53 and the setting information display units W31 to W53 to have brightness higher than that of the background.

Therefore, the sewing machine operator can clearly recognize the current setting content of the sewing pattern, thereby making it possible to perform sewing with the desired setting content.

The control apparatus 90 displays the sewing pattern image in the fourth area R4 along the longitudinal direction of the input screen G1. The control apparatus 90 further perform the display control in which a plurality of buttons B31 to B33 and buttons B51 to B53 disposed along the longitudinal direction of the input screen G1 are disposed in the third area R3 and the fifth area R5 on both the left and right sides of the fourth area R4.

Accordingly, it is possible to dispose the sewing pattern image near the center of the screen. When the longitudinal direction of the sewing pattern image is displayed along a vertical direction, a seam forming direction by the sewing machine 10 and a seam extending direction of the sewing pattern image correspond to each other, such that the sewing pattern can be easily grasped.

When the sewing pattern image is set to the moving image that moves upward as described above, a direction in which the actual sewing pattern is formed and the sewing pattern image correspond to each other, such that it becomes possible to more easily and accurately recognize a formation state of the seam from the sewing pattern image.

In addition to the area division of the first area R1 to the sixth area R6, the buttons B11 to B15, the buttons B21 to B23, the display unit W21, and the display units W61 to W63, which are respective display configurations, are divided and disposed by the vertical virtual line L1, and the dials 83 to 85 are also divided and disposed, such that a layout of a display image is arranged in order regardless of any operation, and the dials 83 to 85 linked to the layout of the display image are also consistent with the layout of the display image, thereby achieving a display effect that visibility of an operation-related configuration is significantly good for the operator.

OTHERS

While the embodiments of the present invention are described above, the present invention is not limited thereto. The details shown in the embodiments can be appropriately modified without departing from the spirit of the invention.

For example, while the embodiments describe a case where the control apparatus 90 performs the display control in which when the input operation is performed on the buttons B22 to B53 and the default data thereof is changed, the contact range of the button is displayed with higher brightness, the present invention is not limited thereto.

For example, the control apparatus 90 may perform display control in which when the input operation is performed on the buttons B22 to B53 (even when the setting content is not changed), the contact range of the button is displayed with higher brightness. Accordingly, the operator of the sewing machine can clearly grasp a button on which the input operation is performed and a setting content thereof.

What is claimed is:

1. A sewing apparatus, comprising:
a display input unit including a display unit configured to display an image of an input screen, and an input detection unit configured to detect an input operation on the input screen; and
a control apparatus that performs display control of the display unit in response to the input operation,
wherein the control apparatus performs display control in which a background of the input screen is set to a dark color as a whole, a sewing pattern image displayed on the input screen is set to brightness higher than that of the background, the sewing pattern image is a moving image that is linked to a sewing operation in which a seam for a stitch move every time a stitch point is performed, and at least one button that receives the input operation on the input screen is set to a color lighter than that of the background.

2. The sewing apparatus according to claim 1, wherein the control apparatus performs display control for increasing brightness of the at least one button on which the input operation is performed.

3. The sewing apparatus according to claim 2, wherein the control apparatus performs display control for changing the color of the at least one button on which the input operation is performed to a color based on blue.

4. The sewing apparatus according to claim 1, wherein the control apparatus:
additionally displays a content display unit indicating a content input for the at least one button, the content display unit being displayed inside of the at least one button, or the content display unit being displayed outside of the at least one button, and
performs display control in which the content display unit is set to brightness higher than that of the background.

5. The sewing apparatus according to claim 1, wherein the control apparatus performs display control in which the sewing pattern image is displayed along a longitudinal direction of the input screen, and the at least one button includes a plurality of buttons disposed side by side along the longitudinal direction of the input screen are disposed on both sides of the sewing pattern image.

6. The sewing apparatus according to claim 1, wherein the control apparatus performs display control in which:
i) a stitch point location in a left and right direction in which the stitch point is currently performed is displayed at an upper end portion of the sewing pattern image,
ii) on a lower side of the stitch point location, a seam formed at a stitch point location where the stitch point is to be performed is displayed, and
iii) the seam for one stitch moves upward every time one stitch point is performed.

7. The sewing apparatus according to claim 1, wherein the control apparatus performs display control in which the sewing pattern image varies depending on a setting value of a seam length and a seam width.

* * * * *